(No Model.)
F. CHRISTENSON.
CRUSHING FORK.
No. 440,861. Patented Nov. 18, 1890.
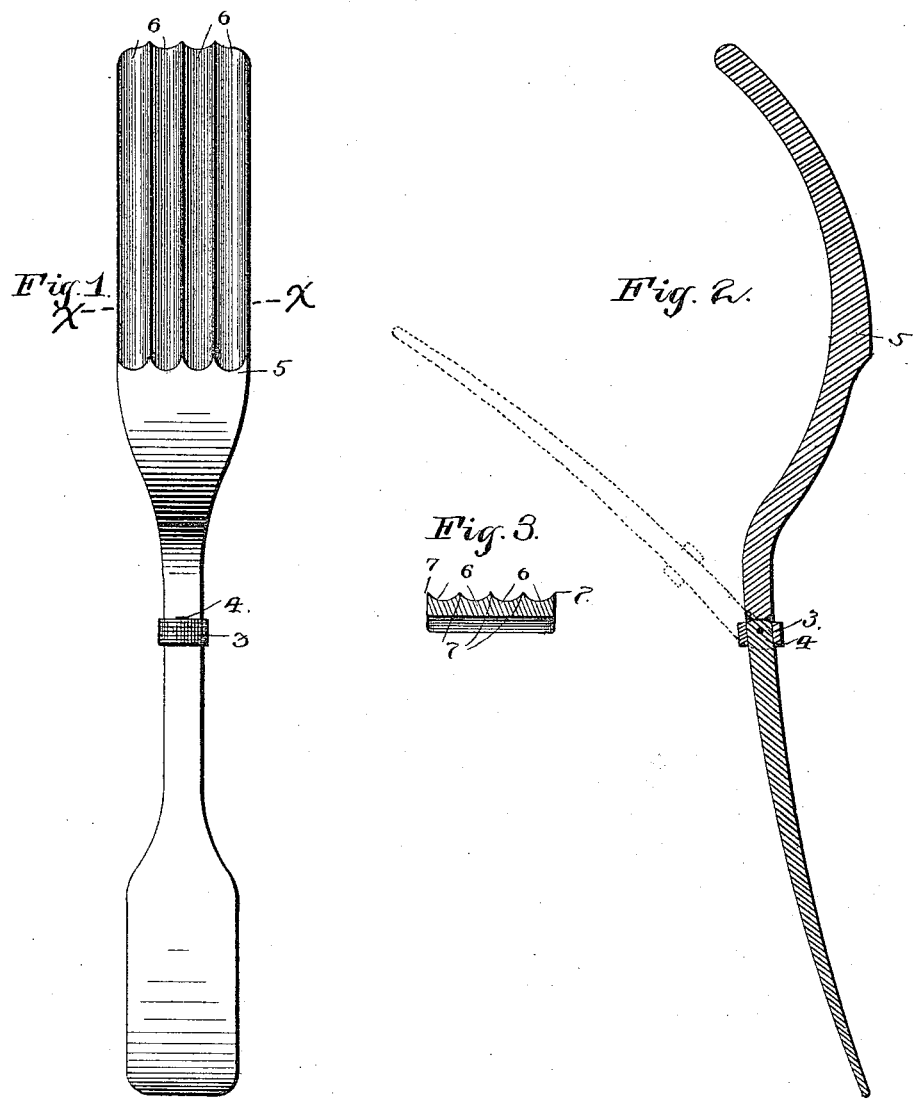
Witnesses
Inventor
Frederick Christenson,
By his Attorneys,
C. A. Snow & Co.

UNITED STATES PATENT OFFICE.

FREDERICK CHRISTENSON, OF FAIR VIEW, UTAH TERRITORY.

CRUSHING-FORK.

SPECIFICATION forming part of Letters Patent No. 440,861, dated November 18, 1890.

Application filed August 15, 1890. Serial No. 362,114. (No model.)

*To all whom it may concern:*

Be it known that I, FREDERICK CHRISTENSON, a citizen of the United States, residing at Fair View, in the county of San Pete and Territory of Utah, have invented a new and useful Masticator, of which the following is a specification.

This invention has relation to table-cutlery, and has for its objects, first, to provide a device adapted and constructed to thoroughly masticate food of most every kind for toothless persons, people with poor or few teeth, children, invalids, &c., the main object in view being to facilitate digestion; second, to construct it in such a shape as will best secure and retain its cutting-capacity property for a long time and make its resharpening easy; third, to construct it so as to best prevent clogging while in use; fourth, to make it in appearance and size, as well as form, an attractive and desirable article of table-cutlery, and, fifth, to adapt it to be conveniently carried in a pocket, if so desired, by people traveling or leading a camp life.

With the above objects in view the invention consists in certain features of construction, hereinafter specified, and particularly pointed out in the claims.

Referring to the drawings, Figure 1 is a rear elevation of a masticator constructed in accordance with my invention. Fig. 2 is a longitudinal section of the same, the handle, as when folded, being shown in dotted lines. Fig. 3 is a transverse section of the blade on the line *x x* of Fig. 1.

Like numerals indicate like parts in all the figures of the drawings.

In practicing my invention I may construct the same of steel or other suitable material and give it any desired finish.

In forming the blade 5 the under surface thereof is provided with a series of parallel longitudinal grooves 6, extending throughout the entire length of the blade. These grooves being semicircular, as shown in Fig. 3, combine to form intermediate cutters or sharp edges 7, which by reason of their hollow sides retain their edges for a greater length of time than if they and the grooves were angular or V-shaped, and, furthermore, may be more easily resharpened. By reason of the grooves being thus wide and smooth in the bottom the substance masticated is less liable to stick in the grooves than if otherwise constructed. The blade 5 with this arrangement has the curvature nearly like the tines of the fork used on the table, and is at one end supplied with or extended into a handle of a similar shape as those used on table-cutlery, but strong enough to endure the pressure upon it when used. The curvature of the lower part of the handle is more abrupt than on the fork to better prevent the handle from being daubed with food. The upper part (top surface) of the blade 5 is suitably ornamented, and the handle may be made with a joint 4 for folding to accommodate people who travel or lead a camp life, &c.

In case the handle is made with a joint it is provided with a slide 3 to cover the joint while used and to be removed therefrom before it can be folded.

The device may vary in size to suit the purpose or the age of the person using it, the common size being somewhat like that of the common table-fork, its intended companion.

As before stated, this device is primarily intended to be used by toothless persons, but may be employed with the same advantage by children, invalids, or others who for any cause cannot or do not chew their food sufficiently. It may also be used for cutting vegetables fine, making poultices, &c.

In operation the handle is grasped by the right hand, and by various suitable movements of the masticator edibles of most every kind, as well as other substances, are converted into a pulp on a plate and by aid of fork or spoon conveyed to the mouth in a suitable condition for the stomach.

Having thus described my invention, what I claim is—

1. The herein-described masticator, consisting of a handle terminating at its lower end in a flared blade, the under surface of which is provided with a series of grooves semicircular in transverse section and combining to form a series of intermediate cutters, substantially as specified.

2. The herein-described masticator, the same consisting of a handle formed in sections hinged together and a slide for the same, the lower section terminating in a flared curved blade, the under surface of which is provided with a series of longitudinal parallel grooves forming intermediate cutters, substantially as specified.

In testimony that I claim the foregoing as my own I have hereto affixed my signature in presence of two witnesses.

FREDERICK CHRISTENSON.

Witnesses:
H. DE FRIES,
GUY C. WILSON.